(12) United States Patent
Sawarkar et al.

(10) Patent No.: US 8,922,191 B2
(45) Date of Patent: Dec. 30, 2014

(54) PEAK CURRENT CONTROLLED SWITCHING VOLTAGE REGULATOR SYSTEM AND METHOD FOR PROVIDING A SELF POWER DOWN MODE

(75) Inventors: Prasad Sawarkar, Bangalore (IN); Srinivas Reddy Chokka, Bangalore (IN)

(73) Assignee: LSI Corporation, Milpitas, CA (US)

( * ) Notice: Subject to any disclaimer, the term of this patent is extended or adjusted under 35 U.S.C. 154(b) by 762 days.

(21) Appl. No.: 13/167,013

(22) Filed: Jun. 23, 2011

(65) Prior Publication Data

US 2012/0161735 A1    Jun. 28, 2012

Related U.S. Application Data

(60) Provisional application No. 61/427,631, filed on Dec. 28, 2010.

(51) Int. Cl.
*H02M 3/156* (2006.01)
*H02M 1/36* (2007.01)

(52) U.S. Cl.
CPC .............. *H02M 1/36* (2013.01); *Y10S 323/901* (2013.01)
USPC ......................................... 323/351; 323/901

(58) Field of Classification Search
USPC ......... 323/271, 272, 282, 283, 284, 285, 901, 323/351; 363/49
See application file for complete search history.

(56) References Cited

U.S. PATENT DOCUMENTS

| | | | |
|---|---|---|---|
| 4,524,412 A | 6/1985 | Eng | |
| 5,959,443 A * | 9/1999 | Littlefield | ..................... 323/287 |
| 7,031,219 B2 | 4/2006 | Hsu et al. | |
| 7,075,276 B2 * | 7/2006 | Morales | ........................ 323/246 |
| 2006/0028191 A1 | 2/2006 | Lee | |
| 2007/0145957 A1 | 6/2007 | Wu et al. | |

* cited by examiner

*Primary Examiner* — Gary L Laxton
*Assistant Examiner* — Afework Demisse
(74) *Attorney, Agent, or Firm* — Sheridan Ross P.C.

(57) ABSTRACT

A peak current controlled switching voltage regulator system and method for providing a self-power down mode. An on-chip voltage regulator integrated into an on-chip digital logic circuit provides a core supply voltage to the on-chip digital logic circuit along with an off-chip inductor. An off-chip regulator connected to the on-chip digital logic circuit provides an external core supply voltage with respect to the on-chip digital logic circuit. A start-up circuit operates the on-chip voltage regulator in a self-power down mode for a pre-determined time period when the on-chip regulator is not connected to the off-chip inductor in order to maintain an equilibrium voltage supply with respect to the on-chip digital logic circuit.

20 Claims, 3 Drawing Sheets

PEAK CURRENT CONTROLLED SWITCHING VOLTAGE REGULATOR SYSTEM AND METHOD FOR PROVIDING A SELF POWER DOWN MODE

CROSS-REFERENCE TO PROVISIONAL APPLICATION

This patent application claims the benefit under 35 U.S.C. §119(e) of U.S. Provisional Application Ser. No. 61/427,631 entitled, "Peak Current Controlled Switching Voltage Regulator System and Method for Providing a Self Power Down Mode," which was filed on Dec. 28, 2010 and is incorporated herein by reference in its entirety.

TECHNICAL FIELD

Embodiments are generally related to digital circuits. Embodiments are also related to voltage regulators. Embodiments are additionally related to system and method for providing self-power down with respect to a voltage regulator.

BACKGROUND OF THE INVENTION

Voltage regulators are switch mode power supplies employed for regulating and controlling a core voltage supply in an on-chip digital logic circuit such as, for example, a microcontroller, a microprocessor, and a microcomputer. Most on-chip digital circuits are configured to use two power supplies, which includes an on-chip regulator and an off-chip regulator. At a given time, only one regulator will be used. So in the case where an off-chip regulator is acting as a supply for on-chip digital logic, the on-chip regulator needs to be powered down. The power down control for the on-chip regulator cannot be on core supply as initially core supply itself is not there and also there is no way to know which regulator is generating core supply. The solution presented detects whether the off-chip inductor is connected to the on-chip regulator and if not, enters power down state.

Most prior art voltage regulators employ an input/output (I/O) pin for performing the power down operation of the on-chip regulator when the off-chip regulator is supplying the core supply voltage. The use of input/output (I/O) pin adds to the cost.

Based on the foregoing, it is believed that a need exist for an improved peak current controlled switching voltage regulator system and method for providing a self-power down mode, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved peak current controlled switching voltage regulator system and method.

It is another aspect of the disclosed embodiments to provide for an improved start-up circuit for providing a self-power down mode.

It is a further aspect of the disclosed embodiments to provide for an improved method for providing the self-power down mode with respect to the peak current controlled switching voltage regulator.

The aforementioned aspects and other objectives and advantages can now be achieved as described herein. A peak current controlled switching voltage regulator system and method for providing a self-power down mode is disclosed herein. An on-chip voltage regulator integrated into an on-chip digital logic circuit provides a core supply voltage to the on-chip digital logic circuit along with an off-chip inductor. An off-chip regulator connected to the on-chip digital logic circuit provides an external core supply voltage with respect to the on-chip digital logic circuit. A start-up circuit operates the on-chip voltage regulator in a self-power down mode for a pre-determined time period (e.g., a comparator count) when the on-chip regulator is not connected to the off-chip inductor in order to maintain an equilibrium voltage supply with respect to the on-chip digital logic circuit.

In general, a peak current controlled switching voltage regulator system and/or method can include the on-chip voltage regulator integrated with an on-chip digital logic circuit, the on-chip voltage regulator associated with an off-chip inductor to provide a core supply voltage with respect to the on-chip digital logic circuit, and the off-chip regulator connected to the on-chip digital logic circuit to provide an external core supply voltage with respect to the on-chip digital logic circuit. The start-up circuit can operate the on-chip voltage regulator in a self-power down mode when the on-chip regulator is not connected to the off-chip inductor in order to maintain an equilibrium voltage supply with respect to the on-chip digital logic circuit. Additionally, the reference comparator can be provided for measuring the reference voltage with respect to the start-up circuit. A peak comparator can also be provided for measuring a peak inductor current limit with respect to the start-up circuit.

A first flip-flop and a second flip-flop of the start-up circuit can be operated in a RESET state until an on-chip gate (POR gate) releases a master RESET. A first gate (PGATE) controlling the gate of a p-channel transistor switch (P-MOSFET switch) transits to a lower state when an output voltage $V_{out}$ is less than a reference voltage $V_{ref}$. The flip-flops are in RESET state in order to transit a second gate (NGATE) controlling the gate of a n-channel transistor switch (N-MOSFET switch) to the lower state. A reference comparator measures the reference voltage $V_{ref}$ with respect to the start-up circuit. The second flip-flop further operates in a SET state in order to RESET the first flop and ramp up the current ($I_L$) from the off-chip inductor via the p-channel transistor switch.

A peak comparator triggers when the inductor current reaches a predetermined peak voltage $V_{peak}$ in order to operate the first flip-flop in the SET state and permit the first gate and second gate of the switch circuit to be high. The p-channel transistor switch turns OFF and n-channel transistor switch turns ON in order to ramp down the inductor current. A zero comparator triggers to RESET the second flip-flop and turn OFF the n-channel switch when the inductor current reaches 'zero'. Such system effectively switches between the on-chip voltage regulator and the off-chip voltage regulator in order to maintain a stable output voltage with respect to the integrated digital circuits such as IP blocks, low level circuits, serializer/deserializer (SER/DES), phase locked loop (PPL), amplifiers, and input/output (I/O) buffers.

The disclosed on-chip regulator can be utilized to generate a core supply voltage required for the on-chip digital logic. In certain applications, a user or customer may provide a core supply voltage using an external off-chip voltage regulator. In that case, the on-chip regulator will not have an off-chip Inductor connected to it. In this particular situation, the on-chip regulator ideally should be in a power down mode. The power down control for an on-chip regulator cannot be on a core supply as initially the core supply itself is not there and also there is no way to "know" which regulator is generating the core supply. So, the power down has to be accomplished through an I/O pin. The solution herein detects whether the off-chip inductor is connected to an on-chip regulator and if not, enters a power down state.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
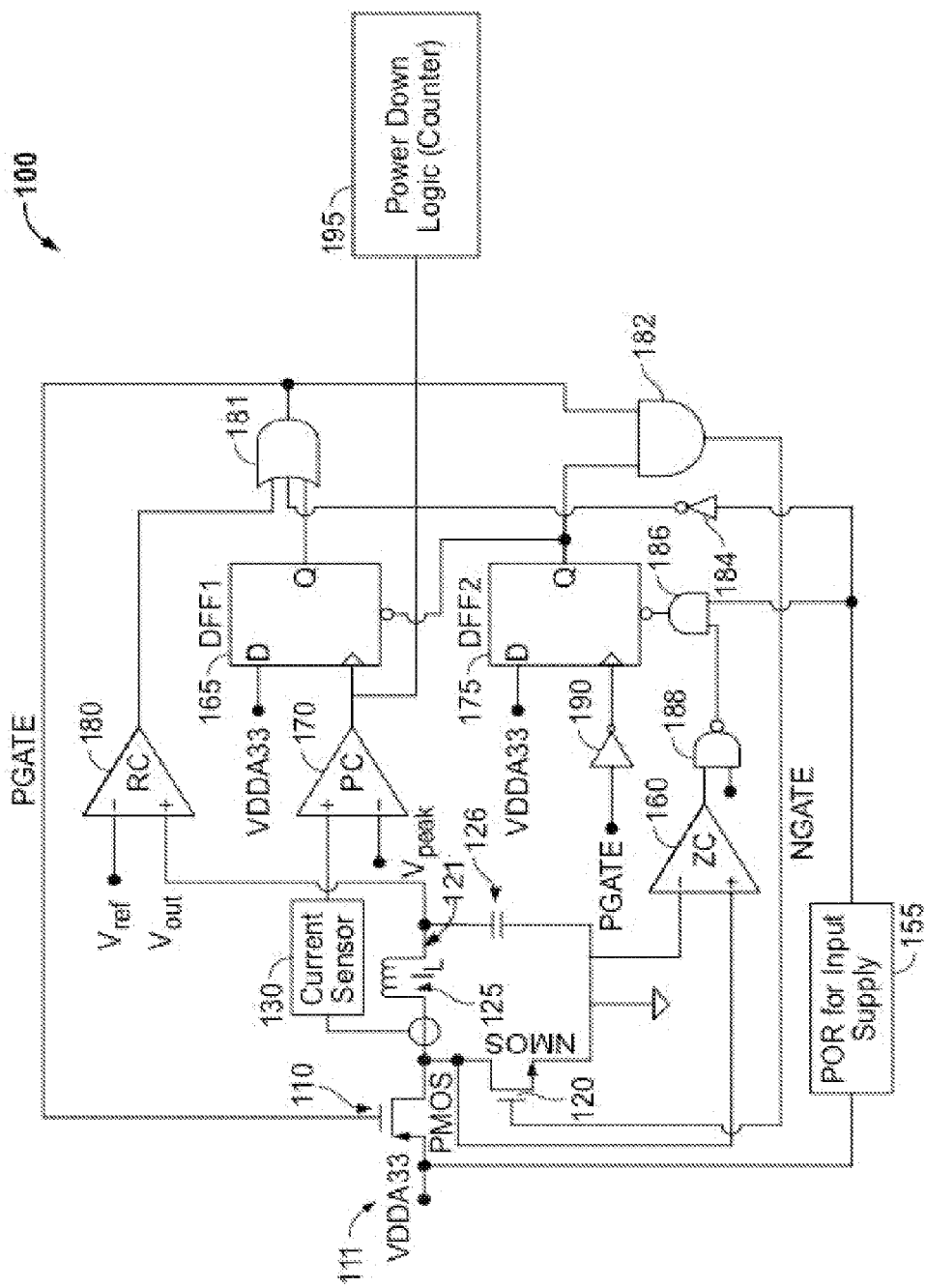
FIG. 1 illustrates a circuit diagram of a peak current controlled switching voltage regulator with a start-up circuit, in accordance with the disclosed embodiments.

FIG. 1 illustrates a circuit diagram of a start-up circuit 100 with self power down ability for a switching voltage regulator, in accordance with the disclosed embodiments. The start-up circuit 100 generally includes an off-chip inductor 125, an off-chip capacitor 126, and one or more on-chip circuits such as, for example, on-chip POR circuit 155, as depicted in FIG. 1. The on-chip POR circuit 155 (i.e., POR for Input Supply) generally connects electrically to an input supply 111, which in turn is connected electrically to a p-channel transistor switch 110. The off-chip capacitor 126 is electrically connected to the off-chip-inductor 125 and the positive input ($V_{out}$) of a reference comparator 180 (RC). Output from the reference comparator 180 can be electrically connected to an input of an OR gate 181, which in turn is electrically connected to an input of an AND gate 182 and to the input supply 111.

The start-up circuit 100 further includes a first flip-flop circuit 165 and a second flip-flop circuit 175. Additionally, the start-up circuit 100 includes a zero crossing comparator 160, along with a peak comparator 170, and the reference comparator 180 having inputs labeled as $V_{ref}$ and $V_{out}$. The zero crossing comparator 160 provides an output that is provided as input to the NAND gate 188. A negative input to the zero crossing comparator 160 is connected to ground and also to the off-chip capacitor 126 and an n-channel transistor switch 120. The start-up circuit further includes a power down logic circuit 195. The power down logic circuit 195 contains a counter. The output from the peak comparator 170 is connected electrically to the power down logic 195 (e.g., which includes a counter) as shown in FIG. 1.

A positive input to the zero crossing comparator 160 is connected electrically to the p-channel transistor switch 110, the current sensing circuit 130, and the off-chip inductor 125. The peak comparator 170 includes an input $V_{peak}$ and an input that is provided as output from a current sensing circuit 130, which is also connected to the off-chip inductor 125. The output from the reference comparator 180 is supplied as input to an OR Gate 181 along with input from an inverter 184 (e.g., a NOT Gate). The start-up circuit 100 also includes the AND Gate 182 having at least one input fed from the output of the OR Gate 181 and a signal from the second flip-flop circuit 175. The second flip-flip-circuit 175 can be connected electrically to the first flip-flop circuit 165. Note that the NAND gate 188 can be in turn connected to the AND gate 186, which in turn can be connected electrically to the second flip-flop circuit 175. An inverter 190 (e.g., a NOT Gate) can be also connected electrically to the second flip-flop circuit 175.

In general, the on-chip POR circuit 155 can toggle from low to high when the input supply 111 to the switching voltage regulator has crossed a particular threshold. Until the on-chip POR circuit 155 toggles, the first flip-flop circuit 165 and the second flip-flop circuit 175 of the start-up circuit 100 are in a RESET state. This ensures that a first gate signal (PGATE) controlling the gate of the p-channel transistor switch 110 and a second gate signal (NGATE) controlling the gate of a n-channel transistor switch 120 are high and low respectively causing regulator output to be in high impedance state. Note that the p-channel transistor switch 110 is a p-channel metal-oxide-semiconductor field-effect transistor (P-MOSFET) switch and the n-channel transistor switch 120 is an n-channel metal-oxide-semiconductor field-effect transistor (N-MOSFET) switch.

Once the on-chip POR circuit 155 toggles, a first gate signal (PGATE) controlling the gate of a p-channel transistor switch 110 (P-MOSFET switch) goes low as output voltage $V_{out}$ is less than a Reference voltage $V_{ref}$. A reference comparator 180 measures the Reference voltage $V_{ref}$ with respect to the start-up circuit 100. As a first gate signal (PGATE) controlling the gate of a p-channel transistor switch 110 (P-MOSFET switch) goes low, this causes second flip-flop circuit 175 to SET there by releasing the RESET state of first flip-flop circuit 165. As a first gate signal (PGATE) controlling the gate of a p-channel transistor switch 110 (P-MOSFET switch) is low, p-channel transistor switch 110 (P-MOSFET switch) is turned ON. Upon this, the current through off-chip inductor 125 starts ramping up.

The current sensing circuit 130 can provide a measurement of the amount of current flowing through off-chip inductor 125. A peak comparator 170 compares the output of current sensing circuit 130 against a predetermined peak voltage $V_{peak}$. As current through off-chip inductor 125 reaches predetermined peak voltage $V_{peak}$, the comparator 170 output toggles from low to high. This causes first flip-flop circuit 165 to SET, eventually a first gate signal (PGATE) controlling the gate of a p-channel transistor switch 110 (P-MOSFET switch) and a second gate signal (NGATE) controlling the gate of an n-channel transistor switch 120 (N-MOSFET switch) to high. This way p-channel transistor switch 110 (P-MOSFET switch) turns OFF and n-channel transistor switch 120 (N-MOSFET switch) turns ON. Upon this, the current through off-chip inductor 125 starts ramping down.

The zero crossing comparator 160 toggles from low to high when the current through the off-chip inductor 125 reaches zero. This causes second flip-flop circuit 175 to RESET, thereby making a second gate signal (NGATE) controlling the gate of an n-channel transistor switch 120 (N-MOSFET switch) to low. This turns OFF n-channel transistor switch 120 (N-MOSFET switch). As the second flip-flop circuit 175 is RESET, the first flip-flop circuit 165 is also in RESET state, once again making a first gate signal (PGATE) controlling the gate of a p-channel switch 110 to go low. This eventually turns ON p-channel transistor switch 110 (P-MOSFET switch) and the current through off-chip inductor 125 starts ramping up again.

Figure 2:
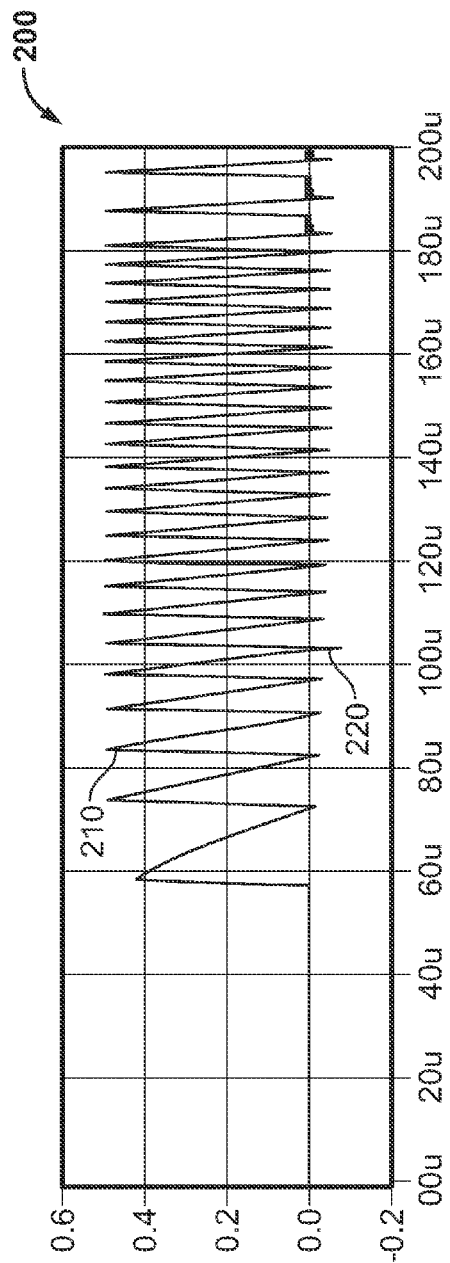
FIG. 2 illustrates a graph indicative of an inductor current flow in a digital logic circuit in the presence of an off-chip inductor, in accordance with the disclosed embodiments.

FIG. 2 illustrates a graph 200 representing the inductor current flow in the digital logic circuit in presence of the off-chip inductor 125, in accordance with the disclosed embodiments. Note that in FIGS. 1-4, identical or similar parts are generally indicated by identical reference numerals. The off-chip inductor 125 of the peak current controlled switching voltage regulator 100 can be a passive electrical component that can store energy an a magnetic field created by the electric field passing through the inductor 125. The off-chip inductor 125 can be a conducting wire shaped coil with one or more loops for creating a strong magnetic field inside the coil due to Ampere's Law. Due to the time-varying magnetic field inside the coil, a voltage $V_{out}$ is induced, according to Faraday's law of electromagnetic induction, which by Lenz's Law opposes the change in current that created it. The region 210 represents the peak inductor current flow in the digital logic circuit in presence of the off-chip inductor 125. The region 220 represents the zero inductor current flow in the digital logic circuit in presence of the off-chip inductor 125.

Figure 3:
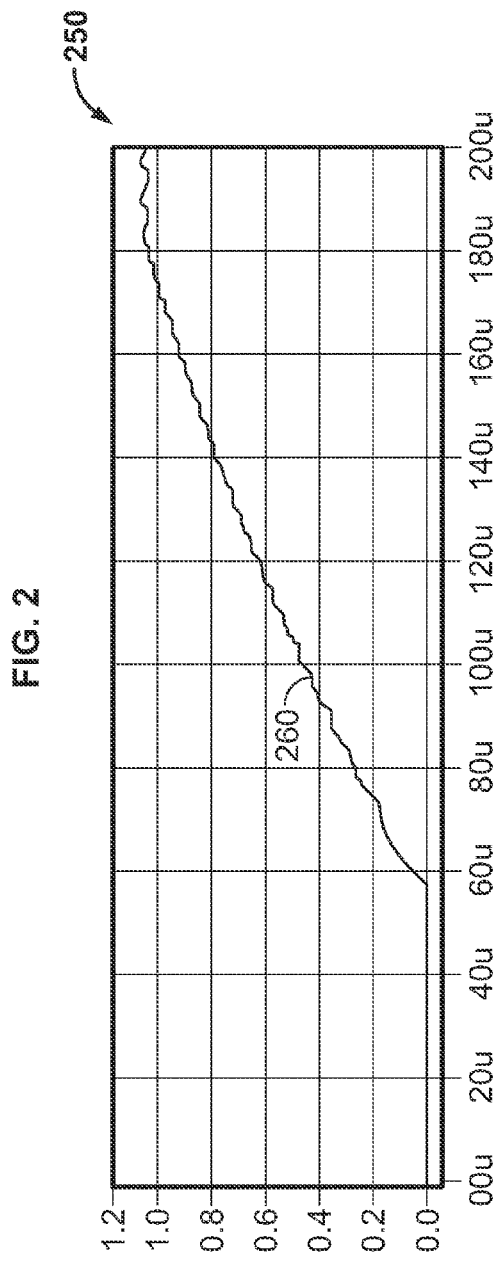
FIG. 3 illustrates a graph indicative of voltage flow in a digital logic circuit, accordance with the disclosed embodiments.

FIG. 3 illustrates a graph 250 representing the voltage flow in a digital logic circuit, in accordance with the disclosed embodiments. The line 260 represents the output voltage $V_{out}$ with respect to the digital logic circuit in presence of the off-chip inductor 125. The ramp up rate of the off-chip inductor 125 can be calculated as follows:

$$dV/dt_{ramp-up} = (V_{in} - V_{out})/L \quad (1)$$

wherein, $V_{in}$ represents the input voltage with respect to the digital logic circuit and $V_{out}$ represents output voltage with respect to the digital logic circuit and L represents the inductance.

Similarly, the down ramp rate of the off-chip inductor 125 can be calculated as follows:

$$dV/dt_{ramp-down} = V_{out}/L \quad (2)$$

From equation (1) and (2), the time required by the current through the off-chip inductor 125 to reach Vpeak from 'zero' and from 'zero' to Vpeak can be calculated. So the number of output transitions Npeak of peak comparator 170 is known for a given time Tpeak. The power down logic 195 comprising a counter counts the output of the Peak comparator 170 output transitions. In the given time Tpeak, if the counter does not exceed the known count Npeak, the on-chip voltage regulator 121 enters in a power down mode. If the count exceeds Npeak, the on-chip regulator is functional.

Figure 4:
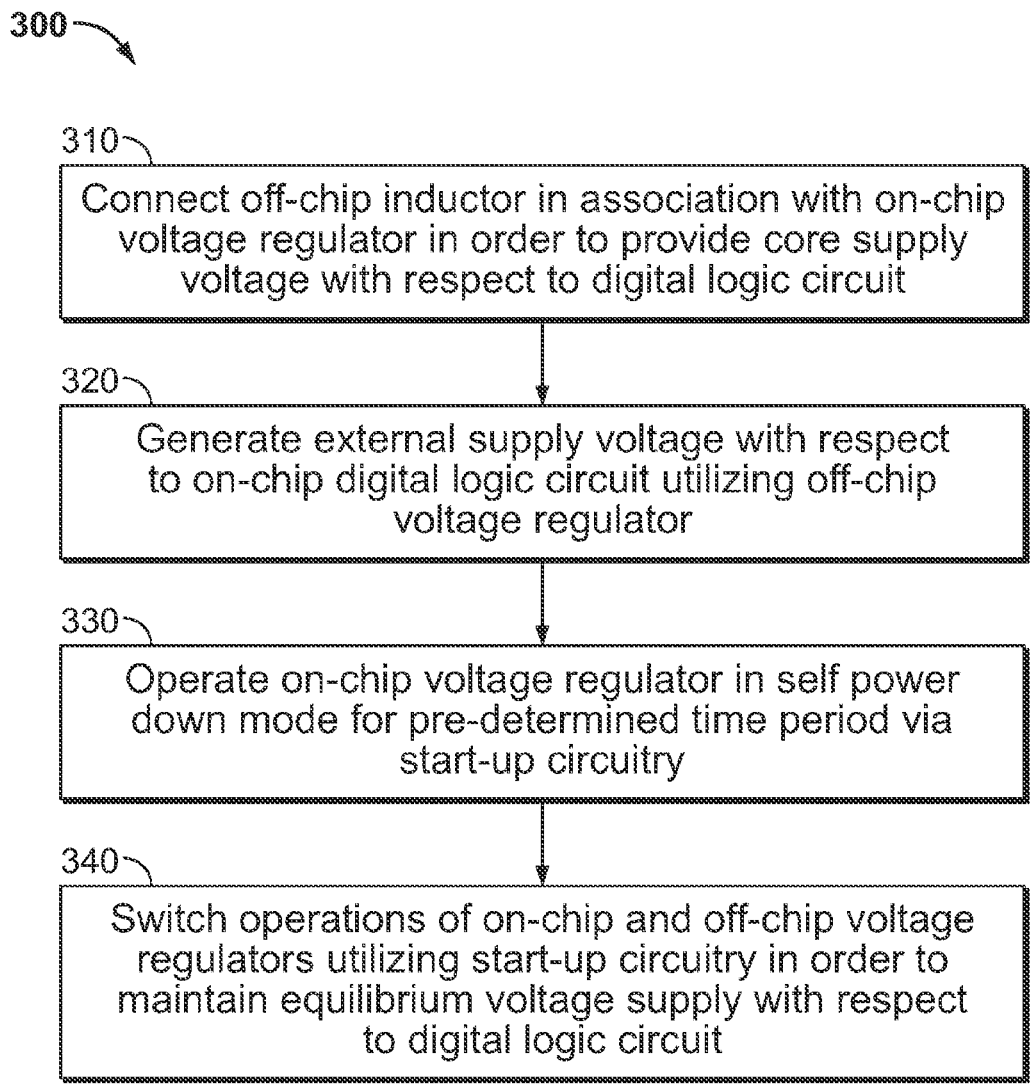
FIG. 4 illustrates a high level flow chart of operations illustrating logical operational steps of a method for providing a self-power down mode with respect to the peak current controlled switching voltage regulator, in accordance with the disclosed embodiments.

FIG. 4 illustrates a high level flow chart of operations illustrating logical operational steps of a method 300 for providing self-power down with respect to the peak current controlled switching voltage regulator start up system 100, in accordance with the disclosed embodiments. The on-chip voltage regulator can be connected in association with the off-chip inductor 125 in order to provide the core supply voltage with respect to the on-chip digital logic circuit, as illustrated at block 310. The off-chip regulator connected to the on-chip digital logic circuit can be further employed to generate the external core supply voltage with respect to the on-chip digital logic circuit, as depicted at block 320.

The on-chip regulator can be operated in the self-power down mode for a pre-determined time period when the on-chip regulator is not connected to the off-chip inductor 125, as illustrated at block 330. The on-chip regulator can be operated in the self-power down mode based on the comparator count. If the comparator count is less than a predetermined value, the start-up circuit 100 can automatically operate the on-chip regulator in the self-power down mode. The operations of the on-chip/off-chip voltage regulators can be switched via the start-up circuit in order to maintain the equilibrium voltage supply with respect to the digital circuit, as indicated at block 340.

The voltage regulator system disclosed herein can be utilized in wide range digital circuit applications for providing stable voltage levels in order to impact the accuracy and fidelity of the digital system. The power up and/or power down operations in the voltage regulator can be effectively accomplished based on the feedback control signals from the power transistor switches. Such voltage regulator system with the startup circuit quickly establishes and maintains a well-regulated output voltage over a wide range of load characteristics.

Based on the foregoing, it can be appreciated that a number of embodiments, preferred and alternative, are disclosed herein. For example, in one embodiment a peak current controlled switching voltage regulator system is disclosed, which can include an on-chip voltage regulator integrated with an on-chip digital logic circuit, the on-chip voltage regulator associated with an off-chip inductor to provide a core supply voltage with respect to the on-chip digital logic circuit. Additionally, in such an embodiment, an off-chip regulator can be connected (e.g., electrically connected) to the on-chip digital logic circuit to provide an external core supply voltage with respect to the on-chip digital logic circuit. A start-up circuit generally operates the on-chip voltage regulator in a self-power down mode when the on-chip regulator is not connected to the off-chip inductor in order to maintain an equilibrium voltage supply with respect to the on-chip digital logic circuit. In some embodiments, a reference comparator can be provided for measuring the reference voltage with respect to the start-up circuit. In still other embodiments, a peak comparator can be utilized for measuring a peak inductor current limit with respect to the start-up circuit.

In another embodiment, a first flip-flop and a second flip-flop of the start-up circuit can operate in a RESET state until an on-chip gate releases a master RESET. In yet another embodiment, a first gate can be utilized to control the gate of a p-channel transistor switch to transit to a lower state when an output voltage is less than a reference voltage and the first flip-flop and second flip-flop are in RESET state in order to transit a second gate controlling the gate of a n-channel transistor switch to a lower state. In still another embodiment, a first flip-flop and a second flip-flop of the start-up circuit can operate in a RESET state until an on-chip gate releases a master RESET. Additionally, a first gate can be utilized in some embodiments to control the gate of a p-channel transistor switch to transit to a lower state when an output voltage is less than a reference voltage and the first flip-flop and second flip-flop are in RESET state in order to transit a second gate controlling the gate of a n-channel transistor switch to a lower state.

In another embodiment, a power down logic circuit can be electrically connected to the peak comparator. Additionally, in some embodiments, the peak comparator can operate the first flip-flop in a SET state and permits the first gate and the second gate to turn ON when the core voltage supply attains a predetermined peak voltage. In yet another embodiment, a zero comparator triggers in order to RESET the second flip-flop and turn OFF the n-channel transistor switch when the inductor current reaches 'zero'. In yet another embodiment, the start-up circuit can switch between the on-chip voltage regulator and on-chip voltage regulator. In other embodiments, the second flip-flop can operate in the SET state in order to RESET the first flip-flop and ramp up the inductor current from the off-line inductor via the p-channel transistor switch. In still other embodiments, the p-channel transistor switch can turn OFF and the n-channel transistor switch can turn ON in order to ramp down the inductor current with respect to the on-chip digital circuit. Additionally, in some embodiments, the p-channel transistor switch can be a P-MOSFET switch and/or the n-channel transistor switch can be a N-MOSFET switch. In other embodiments, the flip-flop and the second flip-flop can be a D-flip flop.

In another embodiment, a peak current controlled switching voltage regulator system can include, for example, an on-chip voltage regulator integrated with an on-chip digital logic circuit, the on-chip voltage regulator associated with an off-chip inductor to provide a core supply voltage with respect to the on-chip digital logic circuit, and an off-chip regulator connected to the on-chip digital logic circuit to provide an external core supply voltage with respect to the on-chip digital logic circuit. Such an embodiment may also include a start-up circuit that operates the on-chip voltage regulator in a self-power down mode when the on-chip regulator is not connected to the off-chip inductor in order to maintain an equilibrium voltage supply with respect to the on-chip digital logic circuit. Additionally, such an embodiment may include a reference comparator for measuring the reference voltage with respect to the start-up circuit, a peak comparator for measuring a peak inductor current limit with respect to the start-up circuit, and a power down logic circuit electrically connected to the peak comparator.

In yet another embodiment, a method may be provided for peak current control of a switching voltage regulator. Such a method may include, for example, the steps of integrating an on-chip voltage regulator with an on-chip digital logic circuit, the on-chip voltage regulator associated with an off-chip inductor to provide a core supply voltage with respect to the on-chip digital logic circuit, and connecting an off-chip regulator to the on-chip digital logic circuit to provide an external core supply voltage with respect to the on-chip digital logic circuit. Additionally, such a method may also include the step of providing a start-up circuit that operates the on-chip voltage regulator in a self-power down mode when the on-chip regulator is not connected to the off-chip inductor in order to maintain an equilibrium voltage supply with respect to the on-chip digital logic circuit. In other embodiments, such a method may include, for example, the steps of measuring the reference voltage via a peak comparator for measuring the reference voltage with respect to the start-up circuit and determining via a peak comparator, a peak inductor current limit with respect to the start-up circuit.

In other embodiments, a step may be implemented for operating a first flip-flop and a second flip-flop of the start-up circuit in a RESET state until an on-chip gate releases a master RESET. In another embodiment, a step may be implemented for controlling via a first gate, a gate of a p-channel transistor switch to transit to a lower state when an output voltage is less than a reference voltage and the first flip-flop and second flip-flop are in RESET state in order to transit a second gate controlling the gate of a n-channel transistor switch to a lower state. In yet another embodiment, a step may be implemented for electrically connecting a power down logic circuit electrically to the peak comparator. In still other embodiments, a step may be implemented for utilizing the peak comparator for operating the first flip-flop in a SET state and permitting the first gate and the second gate to turn ON when the core voltage supply reaches a predetermined peak voltage. Additionally, in some embodiments, the start-up circuit can switch between the on-chip voltage regulator and off-chip voltage regulator.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A peak current controlled switching voltage regulator system, comprising:
   an on-chip voltage regulator integrated with an on-chip digital logic circuit, said on-chip voltage regulator associated with an off-chip inductor to provide a core supply voltage with respect to said on-chip digital logic wherein said on-chip digital logic circuit is provided an external core supply voltage with respect to said on-chip digital logic circuit;
   a start-up circuit that operates said on-chip voltage regulator in a self-power down mode when said on-chip regulator is not connected to said off-chip inductor in order to maintain an equilibrium voltage supply with respect to said on-chip digital logic circuit;
   a reference comparator for measuring said reference voltage with respect to said start-up circuit; and
   a peak comparator for measuring a peak inductor current limit with respect to said start-up circuit.

2. The system of claim 1 further comprising:
   a first flip-flop and a second flip-flop of said start-up circuit that operate in a reset state until an on-chip gate releases a master RESET.

3. The system of claim 2 further comprising:
   a first gate that controls the gate of a p-channel transistor switch to transit to a lower state when an output voltage is less than a reference voltage and said first flip-flop and second flip-flop are in reset state in order to transit a second gate controlling the gate of a n-channel transistor switch to a lower state.

4. The system of claim 1 further comprising:
   a first flip-flop and a second flip-flop of said start-up circuit that operate in a reset state until an on-chip gate releases a master RESET; and
   a first gate that controls the gate of a p-channel transistor switch to transit to a lower state when an output voltage is less than a reference voltage and said first flip-flop and second flip-flop are in reset state in order to transit a second gate controlling the gate of a n-channel transistor switch to a lower state.

5. The system of claim 1 further comprising a power down logic circuit electrically connected to said peak comparator.

6. The system of claim 1 wherein said peak comparator operates said first flip-flop in a SET state and permits said first gate and said second gate to turn on when said core voltage supply attains a predetermined peak voltage.

7. The system of claim 1 further comprising a zero comparator trigger, wherein said zero comparator is provided a negative input from a ground, an off-chip capacitor, and said n-channel transistor switch and wherein said zero comparator output is provided as an input to a NAND gate, in order to RESET said second flip-flop and turn off said n-channel transistor switch when said inductor current reaches 'zero'.

8. The system of claim 1 wherein said start-up circuit switches between said on-chip voltage regulator and off-chip voltage regulator.

9. The system of claim 4 wherein said second flip-flop operates in said SET state in order to RESET said first flip-flop and ramp up said inductor current from said off-line inductor via said p-channel transistor switch.

10. The system of claim 4 wherein said p-channel transistor switch turns off and said n-channel transistor switch turns on in order to ramp down said inductor current with respect to said on-chip digital circuit.

11. The system of claim 4 wherein said p-channel transistor switch comprises a P-MOSFET switch.

12. The system of claim 4 wherein said n-channel transistor switch comprises a N-MOSFET switch.

13. The system of claim 4 wherein said first flip-flop and said second flip-flop comprises a D-flip flop.

14. A peak current controlled switching voltage regulator system, comprising:
  an on-chip voltage regulator integrated with an on-chip digital logic circuit, said on-chip voltage regulator associated with an off-chip inductor to provide a core supply voltage with respect to said on-chip digital logic circuit wherein
  said on-chip digital logic circuit is provided an external core supply voltage with respect to said on-chip digital logic circuit;
  a start-up circuit that operates said on-chip voltage regulator in a self-power down mode when said on-chip regulator is not connected to said off-chip inductor in order to maintain an equilibrium voltage supply with respect to said on-chip digital logic circuit;
  a reference comparator for measuring said reference voltage with respect to said start-up circuit;
  a peak comparator for measuring a peak inductor current limit with respect to said start-up circuit; and
  a power down logic circuit electrically connected to said peak comparator.

15. A method for peak current control of a switching voltage regulator, said method comprising:
  integrating an on-chip voltage regulator with an on-chip digital logic circuit, said on-chip voltage regulator associated with an off-chip inductor to provide a core supply voltage with respect to said on-chip digital logic circuit;
  providing said on-chip digital logic circuit an external core supply voltage with respect to said on-chip digital logic circuit;
  providing a start-up circuit that operates said on-chip voltage regulator in a self-power down mode when said on-chip regulator is not connected to said off-chip inductor in order to maintain an equilibrium voltage supply with respect to said on-chip digital logic circuit;
  measuring said reference voltage via a peak comparator for measuring said reference voltage with respect to said start-up circuit; and
  determining via a peak comparator, a peak inductor current limit with respect to said start-up circuit.

16. The method of claim 15 further comprising operating a first flip-flop and a second flip-flop of said start-up circuit in a reset state until an on-chip gate releases a master RESET.

17. The method of claim 16 further comprising controlling via a first gate, a gate of a p-channel transistor switch to transit to a lower state when an output voltage is less than a reference voltage and said first flip-flop and second flip-flop are in reset state in order to transit a second gate controlling the gate of a n-channel transistor switch to a lower state.

18. The method of claim 15 further comprising electrically connecting a power down logic circuit electrically to said peak comparator.

19. The method of claim 15 further comprising utilizing said peak comparator for operating said first flip-flop in a SET state and permitting said first gate and said second gate to turn on when said core voltage supply reaches a predetermined peak voltage.

20. The method of claim 15 wherein said start-up circuit switches between said on-chip voltage regulator and off-chip voltage regulator.

* * * * *